Oct. 31, 1967 H. R. A. HANSEN ETAL 3,350,612
JERKLESS PATTERN SIGNAL FOR MOTOR ACCELERATION
Filed Feb. 19, 1964 2 Sheets-Sheet 1
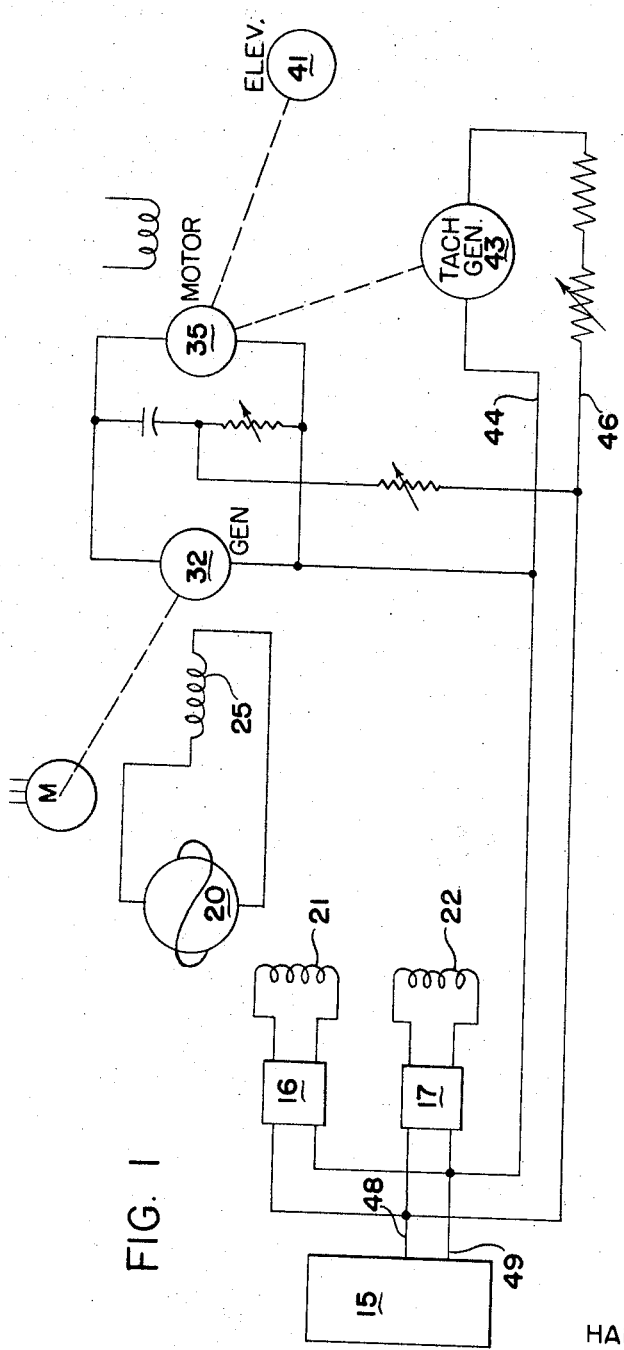
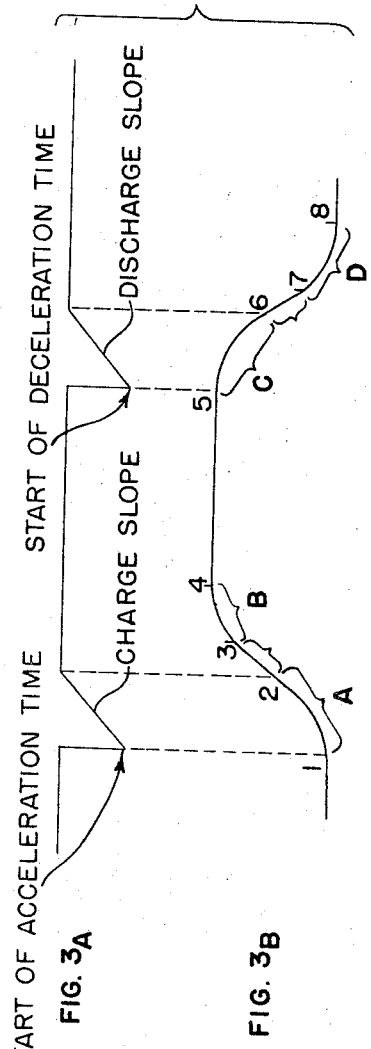
INVENTORS.
HANS RICHARD ANSGAR HANSEN
& ROBERT C. VAN SCHAACK
BY
*Fay & Fay*
ATTORNEYS

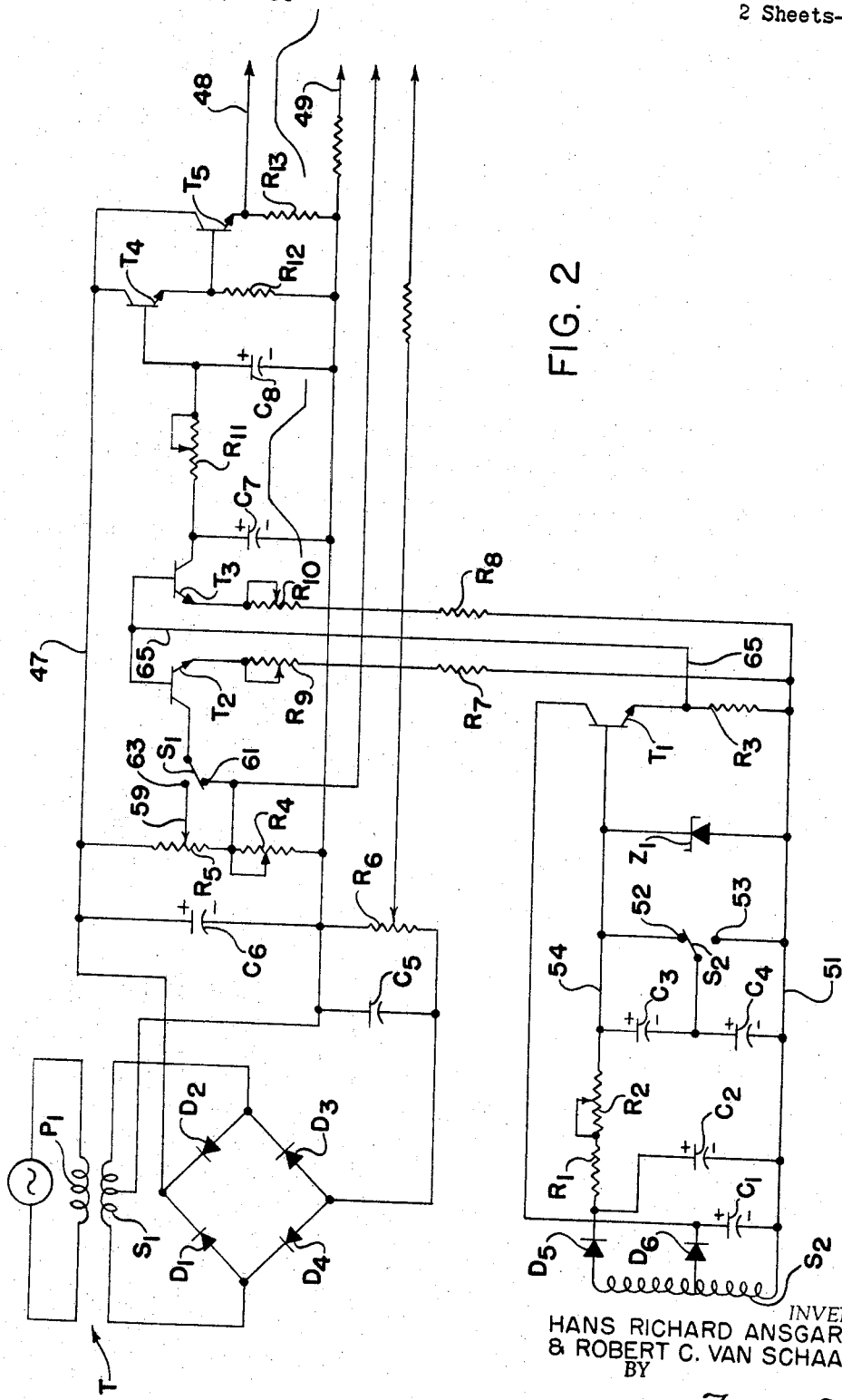

United States Patent Office 3,350,612
Patented Oct. 31, 1967

3,350,612
JERKLESS PATTERN SIGNAL FOR MOTOR ACCELERATION
Hans R. A. Hansen and Robert C. Van Schaack, Akron, Ohio, assignors to The Imperial Electric Company, Akron, Ohio, a corporation of Ohio
Filed Feb. 19, 1964, Ser. No. 346,016
7 Claims. (Cl. 318—143)

This invention relates to control circuitry for motors, and more particularly to control circuitry for generating a pattern signal which is to govern the speed of the motor in accordance therewith.

Heretofore it has been the commercial practice to attain the speed desired from a given motor by applying a given acceleration and/or deceleration pattern to the control field of the generator driving the motor. Furthermore, it has been the practice to supply a feedback monitoring arrangement which continuously surveys the actual speed of the motor in comparison to the desired pattern. Any deviation of the actual speed from the desired pattern results in appropriate circuitry being initiated to eliminate the deviation and achieves the desired matching therebetween. It is well known that if the mechanical system comprised of motor and load is nonelastic the mechanical and electrical stresses in the system can be controlled merely by limiting the acceleration and retardation of the system. However, it is also well known that if the mechanical system comprised of motor and load is not a completely rigid system, but is elastic or semi-elastic, changes in acceleration and deceleration can cause undesirable or dangerous mechanical and electrical stresses in the system and accordingly, it has often been found necessary to limit not only the acceleration and deceleration experienced by the nonrigid bodies, but also the rate of change of acceleration and deceleration experienced thereby. Accordingly, it is an object of this invention to provide circuitry which will not only limit the acceleration and deceleration of a given motor, but will also control the rate of change of acceleration and deceleration.

It is another object of this invention to provide circuitry which can provide different rates of change for the acceleration or deceleration control pattern of a motor.

It is still another object of this invention to provide a speed control pattern generator which is of simple construction and requires a limited number of parts.

It is still another object of this invention to provide an acceleration and deceleration pattern generating circuit which is relatively inexpensive in cost.

It is yet another object of this invention to provide pattern control circuitry which is compatible with existing motor regulating circuitry.

It is still another object of this invention to provide circuitry which can adjust the amount of constant acceleration experienced by a load.

It is a further object of this invention to provide circuitry which can limit and vary the amount of constant deceleration experienced by a given load.

It is still another object of this invention to provide circuitry for generating a motor speed control pattern which does not result in an abrupt change between various desirable speeds.

The above and additional objects and features of this invention will be more fully appreciated from the following detailed description, when read with reference to the accompanying drawings, in which:

FIG. 1 shows in block diagram form the necessary elements to achieve a controlled continuously monitored speed regulation system;

FIG. 2 is a schematic showing the actual electrical wiring diagrams for the novel pattern control circuitry of this invention; and FIG. 3 is a voltage wave form representing the signals developed at various points in the schematic diagram of FIG. 2.

Referring now to FIG. 1, there is shown in block diagram form, a pattern generator 15 which will control not only the accelerations and decelerations experienced by the load 41, in this case assumed to be an elevator, but will also control the appropriate rate of change of acceleration and deceleration desired. The output of pattern generator 15 is fed to a pair of push-pull preamplifiers 16 and 17. The preamplifiers 16 and 17 are shown to be feeding, respectively, control windings 21 and 22 of the metadyne excitor 20. Metadyne excitor 20 is of well known commercial design and accordingly further description in detail will not be made. As a result of the amplifying features of metadyne 20, an appropriate signal will be applied to the power generator field to control the operation of generator 32. In turn, generator 32 will control the speed of motor 35. The output of motor 35 is then used to drive a load 41, in this case assumed to be an elevator. As is usual in cases such as this, feedback circuitry including tachometer 43 and appropriate leads 44 and 46 is provided. Tachometer 43 is used to monitor the speed of motor 35 and provide an appropriate signal over leads 44 and 46 back to preamplifiers 16 and 17. Accordingly, any deviation between the desired speed as dictated at any particular instant by the pattern generator 15 from that sensed by tachometer 43 will result in an appropriate signal being applied to preamps 16 and 17 to compensate for the change, and result in a matching between the signal sensed by tachometer 43 and the desired pattern signal generated by pattern generator 15.

The electrical components and circuitry making up the pattern generator 15 will now be described in more detail in connection with FIG. 2. The pattern control generating means includes adjustable acceleration and deceleration circuitry and also has incorporated therein means for controlling the rate of change of acceleration and deceleration (this last feature being sometimes hereinafter referred to as jerk limiting means).

The circuitry as shown in FIG. 2 embodies the means by which a motor speed signal pattern generator develops across leads 48 and 49 the desired speed pattern which the system wishes the motor to apply to load 41. Accordingly, it follows that a signal will be developed across leads 48 and 49 which not only dictates the speed which motor 35 will apply to load 41, but it will also generate a jerk controlled signal which in fact will limit the rate of change of the acceleration or deceleration of motor 35. Accordingly, an alternating signal will be applied to the primary $P_1$ of transformer T and will thereby generate a voltage across the secondary winding $S_1$. Diodes $D_1$ through $D_4$ represent a full wave rectifier which will change the signal across $S_1$ from an alternating signal to a full wave rectified signal. The full wave rectified signal generated between leads 47 and 49 will be filtered by means of filtering condenser $C_6$. Speed setting potentiometer $R_5$ which is connected between the filtered potential leads 47 and 49 provides the means, by way of its variably positionable arm 59, to select the desired motor speed. Transistors $T_2$ and $T_3$ are connected as shown with the bases thereof being connected together, and a common lead 65 being connected therefrom to the jerk control circuitry at the lower left portion of FIG. 2. The emitters of both transistors $T_2$ and $T_3$ are connected by way of variable resistors $R_9$ and $R_{10}$ and fixed resistors $R_7$ and $R_8$, respectively, to lead 51 of the aforementioned jerk control circuitry.

Variable resistor $R_9$ controls the magnitude of the charging current which will be able to flow through transistors $T_2$ and $T_3$ to the signal generating circuitry comprising integrating capacitor $C_7$ and integrating circuitry $R_{11}$ and $C_8$. Variable resistor $R_{10}$ controls the deceleration current which is permitted to flow from the signal generating means last mentioned through transistor $T_3$ and controls the rate of discharge therethrough.

The collector of transistor $T_2$ is placed in circuit with the variably positionable arm 59 of potentiometer $R_5$ by way of switch $S_1$. The setting of potentiometer $R_5$ is proportional to the desired speed of motor 35, and also is determinative of the upper level of the signal to be generated at the output of the motor signal control circuitry. The collector of transistor $T_3$ is connected by way of integrating capacitor $C_7$ to the ground potential lead 49. Also, transistors $T_4$ and $T_5$ provide in emitter follower fashion the output signal means from the motor control signal generator circuitry of FIG. 2. More particularly, the signal pattern indicative of the motor speed desired, as it is developed across integrating condenser $C_8$, will be applied to the base of emitter follower transistor $T_4$ and accordingly generate a signal across its output resistor $R_{12}$. In turn, the output signal developed across output resistor $R_{12}$ is applied to the base of output transistor $T_5$, and accordingly an output signal will be generated across the output emitter resistor $R_{13}$ connected in circuit with transistor $T_5$. The desired motor control pattern signal is then available across output leads 48 and 49. Transistor $T_5$ has its base connected to the emitter of transistor $T_4$ and its collector connected in parallel with that of transistor $T_4$, and both of the collectors are than connected to positive potential lead 47 in a manner as shown in FIG. 2.

The jerk control circuitry shown at the lower left portion of FIG. 2, and which circuitry is utilized to generate a control pattern having linearly varying acceleration and deceleration signals, comprises a transformer winding $S_2$ which is magnetically coupled to the primary winding $P_1$ of transformer T. Diodes $D_5$ and $D_6$ are shown to have their anodes connected to a secondary winding at spatially removed points, as shown in FIG. 2. Diodes $D_5$ is connected to the uppermost point of secondary winding $S_2$ and diode $D_6$ has its anode connected at approximately midpoint of transformer winding $S_2$. Furthermore, filtering condensers $C_1$ and $C_2$, respectively, connect the cathodes of diodes $D_6$ and $D_5$ to ground potential in a manner as shown. In accordance with the diode and filtering condenser connections across secondary winding $S_2$, positive voltages will be stored across the condensers $C_1$ and $C_2$ to provide the proper biasing voltages for transistor $T_1$ and the operating voltages for the generation of a control pattern generator signal.

In addition, resistor $R_1$ and variable resistor $R_2$, as well as condensers $C_3$ and $C_4$, are connected in series circuit fashion across filtering condenser $C_2$, see FIG. 2. The base of NPN type transistor $T_1$ is connected to the junction formed by rheostat $R_2$ and condenser $C_3$. Also, a bipositionable switch $S_2$ is connected from the junction point between condensers $C_3$ and $C_4$ for selectively charging condenser $C_3$ or $C_4$ in accordance with the position thereof. Furthermore, Zener diode $Z_1$ is connected between the base of transistor $T_1$ and the ground lead 51. More particularly, with the single pole switch $S_2$ making contact with terminal 52, which in turn is connected to positive lead 54, condenser $C_4$ will be charged up to approximately 12 volts. However, upon switch $S_2$ making selective contact with terminal 53, which is connected to ground lead 51, condenser $C_3$ will be charged up to approximately 12 volts. It is, of course, obvious that the positioning of switch $S_2$ from one terminal to the other will not only result in the charging of either condenser $C_3$ or $C_4$, but will also result in the discharging of the other condenser. Zener $Z_1$ has a breakdown voltage of approximately 12 volts and accordingly will permit condensers $C_3$ or $C_4$ to charge up to approximately 12 volts, whereupon a Zener breakdown condition will occur to prevent any further rise in the potential at the base of transistor $T_1$.

Also, as shown in FIG. 2, transistor $T_1$ is connected in emitter follower fashion and accordingly has an output resistor $R_3$ located in its emitter circuit. The control pattern signal, which is the result of the successive respective charging and discharging of either $C_3$ and $C_4$ or $C_4$ and $C_3$ and which will be instrumental in establishing a jerkless acceleration and deceleration interval for the motor speed pattern signal, will be generated across resistor $R_3$ and will then be applied by way of lead 65 to the bases of transistors $T_2$ and $T_3$, respectively. The emitters of $T_2$ and $T_3$ are respectively connected by way of resistors $R_9$, $R_7$, $R_{10}$ and $R_8$ to the negative potential lead 51 and in accordance with the setting of variable resistors $R_9$ and $R_{10}$ will vary the amount of current flow through the transistors $T_2$ and $T_3$. More specifically, the setting of resistor $R_9$ will determine the rate of charging current through transistor $T_2$ and the setting of resistor $R_{10}$ will determine the discharge current rate of transistor $T_3$.

The setting of variable resistor $R_2$, in conjunction with $R_1$ will determine the rate of charge of condensers $C_3$ and $C_4$, depending upon the selective position of switch $S_2$. In accordance with the amount of resistance provided by resistors $R_1$ and $R_2$, a rate of charge to the upper potential level of positive 12 volts will be set for the control pattern signal to be generated by the jerk control circuitry. In the above manner a ramp type signal will be generated across either condenser $C_3$ or $C_4$, the signal changing from a zero to a positive 12 level at a slope as defined by the setting of rheostat $R_2$ and the value of resistor $R_1$, as well as the ratings of the condensers. The actual signal which will be developed at the base of transistor $T_1$, and also, of course, at the output resistor $R_3$, is shown by FIG. 3A. This will be explained in more detail hereinafter. As will be explained herein below, the initial charge slope as shown in FIG. 3A will be operated upon by successive integrating operations to result in the jerkless acceleration interval of the final motor speed control pattern, and the next occurring charge slope will in a like manner result in the jerkless deceleration interval. Also, the amplitude of the motor speed control signal is determined by the setting of the variably positionable arm 59 of potentiometer $R_5$.

In the quiescent state, the selectively positionable arm 59 of potentiometer $R_5$ will be at the ground or zero voltage position. Also, the emitters of transistors $T_2$ and $T_3$ will be at approximately zero volts, and the bases thereof are connected by way of lead 65 to approximately ground potential. The setting of differentially positionable arm 59 relative to potentiometer $R_5$ will set the desired speed at which the motor 35 is to run. Accordingly, the differentially positionable arm 59 is set to the desired speed, which in this case will be represented by a given voltage, and switch $S_1$ will be thrown to make contact with differentially positionable arm 59 by way of terminal 63. Upon the movement of selectively positionable switch $S_1$ to make contact with differentially positionable arm 59, a positive potential will be applied to the collector of transistor $T_2$. Upon the collector of transistor $T_2$ being placed at a positive potential, transistor $T_2$ will conduct and provide a positive condenser charging current to flow. Originally integrating condenser $C_7$ as well as integrating condenser $C_8$, which are the means for generating the motor speed pattern control signal, were in an uncharged state and therefore they would have approximately zero volts thereacross. However, upon the movement of switch $S_1$ transistor $T_2$ conducts, in accordance with a rate as set by the charging control rheostat $R_9$ and the amount of forward biasing applied to the base of $T_2$ as well as to $T_3$ by the control signal generated across resistor $R_3$, to allow a charging current to flow therethrough, and also through transistor $T_3$, to charge condenser $C_7$. In other words, the placement of selectively positionable arm 59 at a positive potential, and the making of switch $S_1$ with contact 63 of differentially positionable arm 59, results in a charging current flowing to signal generating condenser $C_7$ in accordance with a rate which is determined by the control current flowing into the emitter of transistor $T_2$, the value of the charging current being adjustable by the setting of the control current charging rheostat $R_9$.

Therefore, integrating condenser $C_7$ will charge up until a positive voltage is stored thereacross which is equal to the voltage setting of potentiometer $R_5$. The voltage magnitude as set on potentiometer $R_5$ represents the desired speed for motor 35. Concurrently with the application of a positive collector potential on $T_2$ by the throwing of switch $S_1$, switch $S_2$ will be thrown from, let us assume, terminal 52 to terminal 53, and result in condenser $C_3$ being charged up to $+12$ volts. The generation of the pattern signal by condenser $C_3$ will be applied to the base of emitter follower transistor $T_1$ to result in a turning on thereof. The conduction of transistor $T_1$ results in a current flow therethrough to generate a signal across output resistor $R_3$ which is of substantially the same voltage magnitude as that applied to the base thereof.

Accordingly, it can be seen that transistor $T_2$, during the charge time of condenser $C_7$, acts as a charging current path providing means which will permit a charging current to flow therethrough in accordance with the charging current control means $R_9$. Furthermore, it should be emphasized that the charging current will flow from potentiometer $R_5$ through the collector to base path of transistor $T_2$ in the base to collector path of transistor $T_3$ to charge condenser $C_7$ in accordance with the rate thereof. Due to the controlled charging current flowing through the collector to base circuit of both transistor $T_2$ and $T_3$, there will have occurred an integrating of the initial portion, labeled A in FIG. 3B, of the acceleration time to result in a jerkless transition from a given speed to the next higher desired speed. The terminal portion of the acceleration period, labelled B in FIG. 3B, will terminate in an abrupt charge upon condenser $C_7$ reaching the desired speed setting as represented by the voltage setting of potentiometer $R_5$, see the wave form proximate to condenser $C_7$. This terminal portion will be operated upon by logarithmic circuitry $R_{11}$ and $C_8$ to result in a jerkless transition similar to the initial acceleration portion. In a similar manner the deceleration signal will be transformed to provide jerkless transition from a given speed to the next desired lower speed. This will be explained in greater detail hereinbelow.

In accordance with the subjects of this invention, it often occurs in systems operating with or upon nonrigid bodies that it be desirable to control not only the duration of the acceleration and deceleration periods, but that means also be provided to control the rate of change of the acceleration or deceleration. It is to provide a means for controlling the rate of acceleration or deceleration that the circuitry of FIG. 2 is directed.

The purpose of the jerk control circuitry as shown in the lower left portion of FIG. 2 is to provide a variable predetermined amount of controlled charge current to flow through charging current control means $R_9$, and a predetermined amount of controlled discharge current to flow through discharge control means $R_{10}$. Therefore, as was discussed above, if the charging control current, at the time that speed setting potentiometer $R_5$ is moved from its zero potential position to a positive potential position, is kept at a constant value and if resistor $R_{11}$ is short circuited, the signal developed across the pattern generating resistor $R_{12}$ would be a ramp type signal which initially starts at zero, let us assume, and then rises at a predetermined rate to the desired voltage which is indicative of the desired speed, and then after running at this desired speed for a predetermined time the condenser would discharge at a linear deceleration rate to the next desired lower voltage.

However, if the controlled charging current is in turn controlled by some additional added circuitry so that it can be varied at a constant rate during the initial interval of the acceleration period, and then permitted to remain at a constant rate for some predetermined period of the acceleration period, and lastly be varied at a controlled rate for the terminating portion of the acceleration period, it is seen that the acceleration pattern which would be generated at the output resistor would have a shape as shown in FIG. 3B. As shown in FIG. 3B, the acceleration period is modified at the initial and terminating portion thereof to accomplish a smooth transition between the changes in speed. In a like manner, the deceleration period will also be operated upon to result in a smooth transitional period at the initial and terminating portions thereof to result in a jerkless transition between speeds.

To the above end, reference is made to FIG. 3A which represents a signal generated by the jerk control circuitry of FIG. 2, and which will be applied by way of lead 65 to the bases of control current path providing transistors $T_2$ and $T_3$ to limit the amount of controlled charge and discharge current flowing therethrough. Therefore, by varying the amount of controlled charging current that can flow through transistors $T_2$ and $T_3$ we virtually will attain an integrating action by condenser $C_7$ upon the charge and discharge slopes generated by the control pattern generating means as provided in the lower left portion of FIG. 2. Furthermore, by an additional logarithmic operation upon the integrated signal as generated by condenser $C_7$, a totally jerkless speed pattern control signal will be generated across output resistor $R_{13}$.

Analyzing the acceleration pattern of the wave form as shown in FIG. 3B, it is seen that in section 2–3 we have a constant acceleration, whereas in sections 1–2 and 3–4 the rate of change of acceleration (jerk) is limited and can be controlled. It is therefore obvious, that by way of the circuitry as shown in FIG. 2 we have the means for generating a motor speed control signal in which not only the acceleration or deceleration is controlled, but also the rate of change in the acceleration or deceleration is controllable.

In accordance with the description so far given it is seen that variable rheostat $R_2$ adjusts the slope of the acceleration and deceleration intervals of both the control pattern signal generated by the lower left portion of FIG. 2, as well as the motor speed pattern signal generated across output resistor $R_{13}$. Also, potentiometer $R_5$ establishes the desired motor speed in terms of a positive voltage which is applied to the collector of NPN type transistor $T_2$. Variable rheostat $R_9$ as well as the resistance provided by transistors $T_2$ and $T_3$ along with condenser $C_7$ provides the integrating circuitry which operates upon the charge slope as shown in FIG. 3A to result in an integration thereof. The result of the last mentioned integration is a smoothing out of the lowermost portion of the acceleration period, see the portion of FIG. 3B labelled A. Variable rheostat $R_{11}$ and condenser $C_8$ form the additional logarithmic operating circuitry for performing a logarithmic or integrating operation upon the terminal portion of the acceleration period and result in a smoothing out thereof, see the portion of FIG. 3B labelled B. After the motor has run at the desired speed for a predetermined length of time a throwing of switch $S_1$ and $S_2$ will result in the lower left portion of FIG. 2 generating the slope labelled "discharge slope" in FIG. 3A. Condenser $C_7$ along with the resistance provided by transistor $T_3$ and rheostat $R_{10}$ will perform an integrating operation on the uppermost portion of the deceleration time to result in a smoothing out thereof, see the portion of deceleration time labelled C in FIG. 3B. The motor will continue to run at a constant deceleration rate for the interval labelled 6–7 at FIG. 3B, and will have the terminal portion of the deceleration time operated upon by logarithmic circuitry rheostat $R_{11}$ and condenser $C_8$ to result in a smoothing out thereof as shown by the portion of the deceleration time labelled D in FIG. 3B. It can thus be seen that by the selective setting of slope control rheostat $R_2$, charge control current rheostat $R_9$, discharge control rheostat $R_{10}$, and rheostat $R_{11}$, a plurality of different motor control reference patterns may be generated across the output resistor $R_{13}$. The voltage or the signal across resistor $R_{13}$ is then used as a reference voltage for various speed controls of a system such a elevators, etc.

*Theory of operation*

Let us assume that it is desired to generate the motor speed control pattern signal shown in FIG. 3B at the output resistor $R_{13}$. From FIG. 3B it is possible to obtain the desired initial interval of acceleration 1–2, the duration of the constant acceleration interval 2–3, and the desired terminating acceleration 3–4. It is also possible to determine the desired initial deceleration interval 5–6, the duration of the constant deceleration interval 6–7 and the terminating deceleration interval 7–8. In accordance with the determination of the various intervals, the jerk control rheostat $R_2$ would be set to achieve the desired rate of change of slope. Furthermore, the duration of the interval 1–2 and 3–4 would be established by the setting of rheostat $R_2$ and $R_{11}$, respectively. Also, the desired deceleration intervals 5–6 and 7–8 would be established by the setting of rheostat $R_2$ and $R_{11}$, respectively. $R_9$ adjusts the slope of interval 2–3, and $R_{11}$ adjusts the slope of interval 6–7. $R_2$ adjusts the time necessary to achieve the maximum slopes of intervals 2–3 and 6–7. Furthermore, the ultimate speed desired would be established by the setting of variably positionable arm 59 relative to potentiometer $R_5$. Also, switches $S_1$ and $S_2$ will be in the position as shown in FIG. 2.

After the rheostats have been set to achieve the desired conditions, selectively positionable switches $S_1$ and $S_2$ will be thrown from their present condition to make contact with the other terminals associated therewith. In the initial quiescent position with switch $S_2$ making contact with terminal 52 condenser $C_4$ will have been charged to a positive 12 volts. At the desired motor starting time, which marks the initiation of the acceleration time, we will throw both switches $S_1$ and $S_2$ so that $S_1$ makes contact with arm 59 and $S_2$ makes contact with terminal 53 and therefore place an initial positive voltage, as determined by the setting of selectively positionable arm 59, to the collector of charging current circuit means transistor $T_2$. The throwing of switch $S_2$ from terminal 52 to 53 will result in an immediate discharge of condenser $C_4$, see FIG. 3A, to result in a drop of potential at the base of transistor $T_1$ from approximately 12 volts to approximately zero volts. Condenser $C_3$ will then charge up to a preestablished level, as determined by the breakdown voltage of Zener diode $Z_1$, which is a positive 12 volts, through resistors $R_1$ and rheostat $R_2$. The base of transistor $T_1$ being connected in circuit with condenser $C_3$ will accordingly also be elevated to approximately 12 volts. The base of transistor $T_1$ will then remain at this positive 12 volts for the duration of the acceleration period. Furthermore, the base of transistor $T_1$ will remain at a positive 12 volt level until switches $S_1$ and $S_2$ are rethrown to their initial positions at the start of the deceleration period.

The upward, positively directed charge slope as shown in FIG. 3A, representing the charge time of condenser $C_3$, is applied to the base-emitter terminal of the charging current control means $T_2$, and discharging current control means $T_3$. This initiating signal applied to the bases of transistors $T_2$ and $T_3$ is applied concurrently with the positive voltage being applied to the collector of transistor $T_2$. Accordingly, a charging current will flow through the collector-base circuit of transistor $T_2$ and the base collector circuit of transistor $T_3$ at a rate established by the resistance setting of rheostat $R_9$ and the resistance $R_7$ along with the impedance offered by transistors $T_2$ and $T_3$. Accordingly, integrating condenser $C_7$ will operate upon the control signal generated by emitter follower $T_1$, which we have called our control signal generating signal, and which is applied to the base of the charging current control transistor $T_2$. Condenser $C_7$ will operate upon the linear upwardly directed control slope generated across resistor $R_3$ in an integrating fashion and accordingly result in a parabolically shaped initial period for the acceleration interval of the control signal. Condenser $C_7$ will thereafter continue to charge at a linear rate to an upper level as determined by the speed setting potentiometer $R_5$ with an abrupt change in wave form resulting at the terminal portion of the acceleration interval, see the wave form proximate condenser $C_7$ in FIG. 2.

In effect, condenser $C_7$ will integrate the ramp signal (linear, upwardly directed charge slope) generated by the control circuit to yield a parabolic initial interval for the acceleration portion of the motor speed control signal. The wave form generated by integrating condenser $C_7$ is then operated upon by the logarithmic function generating means comprising rheostat $R_{11}$ and condenser $C_8$ (which may in fact be another integrating network). Rheostat $R_{11}$ and condenser $C_8$ will have little or no effect upon either the parabolically shaped initial interval of the acceleration time and the constant acceleration portion of the acceleration interval, but will result in smoothing out the abrupt change experienced at the upper portion of the wave form to approximate a parabola, see the wave form proximate output resistor $R_{13}$ in FIG. 2.

After the motor has operated at the desired speed for a predetermined length of time, switches $S_1$ and $S_2$ will be thrown back to their original position, as shown, and accordingly the removal of switch $S_1$ from contact with arm 59 will remove the positive collector voltage from the collector of transistor $T_2$. Also, upon switch $S_2$ being thrown to its initial position in contact with terminal 52, condenser $C_3$ will be shorted out. The shorting out of condenser $C_3$ will result in an immediate drop of the voltage at the base of transistor $T_1$ to approximately ground potential. Therefore, the wave form at the base of transistor $T_1$ will be as shown in FIG. 3A.

Thereafter, condenser $C_4$ will charge up to approximately 12 volts potential to result in a rise of the voltage at the base of transistor $T_1$. Again, as in the case of the charging of condenser $C_3$, the breaking down of Zener diode $Z_1$ will prevent condenser $C_4$ from charging to a value above 12 volts. The charging up of condenser $C_4$ generates the positive upwardly directed ramp signal labeled "discharge slope" at FIG. 3A, and in fact also marks the beginning of the deceleration interval of the motor speed control signal. Furthermore, as will be explained, it is the shape of the discharge slope as established by resistor $R_1$, rheostat $R_2$, and condenser $C_4$ which is determinative of the final shape of the deceleration interval of the motor speed control signal. This discharge of condenser $C_7$ will continue at a linear rate until it reaches the new desired speed as set by potentiometer $R_5$ (and in this case assumed to be zero speed). Upon condenser $C_7$ discharging at a linear rate to a value indicative of the new desired speed an abrupt transition as shown by the wave form proximate condenser $C_7$ will occur.

The deceleration signal generated by condenser $C_7$ is transmitted to the logarithmic operating circuitry, rheostat $R_{11}$ and condenser $C_8$, after an inherent finite delay time, to result in a shaping thereof in a manner similar to that occurring during the acceleration period. Therefore, parabolic wave form labeled C initially occurring at the beginning of the deceleration time will be unaffected thereby and instead will be passed on to the output resistor $R_{13}$. Furthermore, the interval of linear deceleration indicated by numerals 6–7 in FIG. 3B will also be unaffected by the logarithmic circuitry. However, the abrupt change experienced at the termination of the deceleration time will be operated upon to result in a logarithmic curve similar to that which occurs at the initial deceleration time.

We have accordingly shown that it is possible by use of the circuitry disclosed in this invention to generate a motor speed control signal which is jerkless and incorporates circuitry for a smooth transition acceleration period between desired speeds and also provides for a smooth jerkless deceleration interval between desired speeds. By use of the circuitry, I am able not only to control the rate of acceleration and deceleration between desired speeds, but also the rate of change of the acceleration and deceleration intervals therebetween.

While it will be apparent that the embodiment of the invention herein disclosed is well calculated to fulfill the objects of the invention, it will be appreciated that the invention is susceptible to modification, variation and change without departing from the proper scope or fair meaning of the appended claims.

What is claimed is:

1. A variable speed control circuit for generating a motor speed control pattern comprising: jerk control circuit means for generating a signal pattern having a controlled linear charge portion and a controlled linear discharge portion, said jerk control circuit means including charge storage means, switching means for selectively charging and discharging said charge storage means to provide said linear charge and discharge portions of said signal pattern, means for limiting the charge on said charge storage means to a predetermined magnitude and first output circuit means for deriving said signal pattern from said jerk control circuit means; means for establishing the desired motor speed; current control means responsive to said motor speed establishing means and operatively connected to said first output means of said current control means including first means for controlling the said linear charge portion from said jerk control circuit means and second means for controlling the said linear discharge portion from said jerk control means; signal shaping means responsive to said current control means to provide controlled rates of change of said charge and discharge portions of said signal pattern to provide a jerkless acceleration and deceleration signal; and output circuit means responsive to said signal shaping means to provide a motor speed control signal at the output of said speed control circuit.

2. A variable speed control circuit for generating a jerkless motor speed control pattern comprising: jerk control circuit means for generating a signal pattern having a controlled linear charge portion and a controlled linear discharge portion, said jerk control circuit means including charge storage means, first switching means for selectively charging and discharging said charge storage means to provide said linear charge and discharge portions of said signal pattern, means for adjusting the rate of charge and discharge of said storage means, means for limiting the charge on said storage means to a predetermined magnitude, and first output circuit means for deriving said signal pattern from said jerk control circuit means; means for establishing the desired motor speed; second switching means in circuit with said motor speed establishing means and correlatively operative with said first switching means; current control means in circuit with said first switching means and with said first output circuit means, said current control means including means for controlling the said linear charge portion of said signal pattern from said first output circuit means, means for varying the magnitude of said charging current, means for controlling said linear discharge portion of said signal pattern from said first output circuit means, and means for varying the magnitude of said discharge current; signal shaping means responsive to said current control means, including variably-controllable integrating circuit means, to provide controlled rates of change of said charge and discharge portions of said signal pattern to provide a jerkless acceleration and deceleration signal; and output circuit means responsive to said signal shaping means to provide a motor speed control signal at the output of said speed control circuit.

3. A variable speed control circuit for generating a jerkless motor speed control signal pattern comprising, differentially positionable means establishing the desired motor speed for said motor speed signal pattern in accordance with the voltage setting thereof, signal generating means generating linearly increasing time variable signals, signal clamping means limiting the linearly increasing time variable signal at a predetermined voltage magnitude, acceleration current circuit means normally being in a cut-off condition and operative in response to said voltage from said differentially positionable means and to said linearly increasing time variable signal to permit a linear charging current to flow therethrough, first switching means operatively connecting said differentially positionable means to said acceleration current circuit means, second switching means operable concurrently with the said first switching means for initiation of said signal generating means and the generation of a linearly increasing time variable signal therefrom, integrating circuit means operatively connected and responsive to charging current from said acceleration current circuit means and attaining a voltage charge equal to the setting of said differentially positionable means along a controlled rate of charge acceleration path, and deceleration signal generating means including discharge current circuit means responsive to a decrease in charging current being supplied to said integrating circuit means due to a decreased voltage setting of said differentially positionable means and said second switching means being returned to its initial setting to initiate the generation of a second linearly increasing time variable signal therefrom, said integrating circuit means being operatively connected to said discharge current circuit means and responsive to the cessation of charging current from said acceleration current circuit means resulting in a discharge of current through said discharge current circuit means to the new voltage setting of said differentially positionable means along a controlled rate of discharge deceleration path, and motor speed control signal output means whereat the jerkless motor speed control signal is obtainable.

4. A variable speed control circuit for generating a jerkless motor speed control signal pattern comprising, speed setting means including differentially positionable voltage means reflecting the desired speed by the voltage position thereof, signal generating means including a first condenser for generating a linear time variable signal, clamping means operable upon said first condenser attaining a predetermined magnitude to prevent further charges thereof, first switching means operable to initiate a charging of said first condenser concurrently with said differentially positionable voltage means being positioned in a speed increasing direction and to initiate a discharge thereof upon said differentially positionable voltage means assuming a speed decreasing position, a second condenser operably connected to said first switching means and initiating a discharge thereof concurrently with the charging of said first condenser and being linearly charged concurrently with the discharge of said first condenser, acceleration current control means, second switching means operably connecting said acceleration current control means to said differentially positionable voltage means, circuit means connecting said signal generating means to said acceleration current control means to result in a linear charging current to flow therethrough, signal integrating means including a third condenser operatively connected in circuit with said acceleration current control means, said integrating condenser charging up to the voltage setting of said differentially positionable voltage means by current supplied thereto by said acceleration control current means along a jerkless acceleration path, and deceleration current control means responsive to said differentially positionable voltage means assuming a reduced voltage position and said linearly increasing signal from said second condenser occurring concurrently therewith to result in a linear discharge current to flow from said integrating condenser to accordingly result in said integrating condenser discharging to the reduced voltage setting of said differentially positionable voltage means along a jerkless deceleration path.

5. A variable speed control circuit for generating a jerkless motor speed control signal pattern comprising, a variably positionable voltage means establishing a speed representation in accordance with the voltage setting thereof, linear time variable signal generating means including a series circuit having a fixed resistance, a variable resistance means, and a pair of condensers, circuit means having a switch connected to the junction point of said pair of serially connected condensers for selectively charging one of said pair of condensers and concurrently discharging the other in accordance with the position of said switch, clamping means operatively connected across said pair of condensers limiting the charge accumulation thereon at a predetermined voltage magnitude, said generating means accordingly generating a signal made up of an initial upwardly directed time variable slope, said slope controlling the acceleration interval of the desired motor signal, a horizontally extending interval commencing upon said initial slope attaining said predetermined voltage magnitude and being representative of the time at which the motor is to run at a desired speed, and a second upwardly directed time variable slope resulting from the positioning of said bi-positionable switch to its second position after the motor has run at the desired speed for the desired length of time and accordingly controlling the deceleration interval of said motor, acceleration current control means operably connected in circuit with said variably positionable voltage means, circuitry operatively connecting said linear time variable signal generating means to said acceleration current control means, said acceleration circuit control means passing a controlled charging current in response to the application of said control signals thereto, signal shaping means including an integrating condenser means operatively connected to said acceleration current control means, said circuitry resulting in a charging up of said integrating condenser to the voltage level of said variably positionable voltage means along a controlled rate of charge acceleration interval, deceleration current control means operatively connected to said signal shaping means, and circuit means connecting said linear time variable signal generating means to said deceleration current control means, said deceleration circuit control means resulting in a discharge of said integrating condenser to the reduced voltage setting of said variably positionable voltage means along a controlled rate of charge deceleration interval.

6. A variable speed control circuit for generating a jerkless motor speed control signal pattern comprising, motor speed setting means including a voltage source having a differentially positionable voltage selecting means, time variable linear signal generating means including serially connected fixed resistance means, variable resistance means, and a pair of condensers, a bi-positional switch operably connected in circuit with said pair of condensers such that in accordance with its selective positioning one of said condensers will be shorted and the other in a charging relation to said resistance means, signal clamping means operatively connected across said pair of condensers limiting the voltage accumulation thereon to a predetermined voltage magnitude, said switching means operable concurrently with said differentially positionable voltage selecting means assuming a desired speed setting position to result in the charging of the first of said pair of condensers along a pre-established slope, said charging slope controlling the acceleration interval of the motor speed control signal pattern, said charging slope continuing until said charging condenser reaches said predetermined voltage magnitude whereupon the signal generated continues at said predetermined magnitude for the predetermined time at which the motor is to run at the speed as set by said motor setting means, upon said speed setting means assuming a lower speed indicating position to mark the beginning of the deceleration interval, said switch being operable to assume the other of its positions and resulting in a discharge of said first condenser and the charging up of the other of said pair of condensers along a predetermined slope, said charging slope of said second condenser controlling the deceleration interval of the motor speed control signal pattern, current control means including a pair of transistors having serially connected bases and the emitters thereof having in circuit therewith fixed resistance means and variable resistance means, said signal from said time variable linear signal generating means being applied across said emitter-base circuit of said current control means, the collector of the first of said pair of transistors in circuit with said differentially positionable voltage selecting means, an integrating condenser operatively connected in circuit with the collector of the other of said pair of transistors, a logarithmic shaping circuit being connected across said integrating condenser, and motor speed control pattern output means operatively connected across the output of said logarithmic shaping circuit, such that upon said differentially positionable voltage selecting means assuming a given speed setting position and said switch being set to result in said acceleration charging slope being generated by said time variable linear signal generating means a controlled rate of charge will flow through said current control means to enable said logarithmic shaping circuit to generate in voltage at its output in accordance with the motor speed setting means along a jerkless acceleration interval, and said control current means also being responsive to a reduction in the motor speed setting means and said deceleration charging slope being generated by said time variable linear signal generating means by the setting of said switch concurrently therewith, to result in said logarithmic shaping circuit attaining said reduced motor speed setting along a jerkless deceleration interval.

7. A variable speed control circuit for generating a jerkless motor speed control signal pattern comprising, selectively settable voltage means having differentially positionable means establishing the desired motor speed for said motor speed signal pattern in accordance with the voltage setting thereof, condenser type signal generating means generating linearly increasing time variable signals, signal clamping means limiting the linearly increasing time variable signal at a predetermined voltage magnitude, acceleration current circuit means normally being in a cut-off condition and operative in response to said voltage from said differentially positionable means and to said linearly increasing time variable signal to permit a linear charging current to flow therethrough, first switching means operatively connecting said differentially positionable means to said acceleration current circuit means, second switching means operable concurrently with the said first switching means for initiation of said signal generating means and the generation of a linearly increasing time variable signal therefrom, integrating circuit means operatively connected and responsive to charging current from said acceleration current circuit means and attaining a voltage charge equal to the setting of said differentially positionable means along a controlled rate of charge acceleration path, and deceleration signal generating means including discharge current circuit means responsive to a decrease in charging current being supplied to said integrating circuit means due to a decrease voltage setting of said differentially positionable means and said second switching means being returned to its initial setting to initiate the generation of a second linearly increasing time variable signal therefrom, said integrating circuit means being operatively connected to said discharge current circuit means and responsive to the cessation of charging current from said acceleration current circuit means resulting in a discharge of current through said discharge current circuit means to the new voltage setting of said differentially positionable means along a controlled rate of discharge deceleration path, and motor speed control signal output means whereat the jerkless motor speed control signal is obtainable.

References Cited

UNITED STATES PATENTS

| | | | |
|---|---|---|---|
| 2,885,620 | 5/1959 | Haas | 318—286 |
| 2,954,514 | 9/1960 | Hemstreet | 318—28 |
| 2,982,907 | 5/1961 | Long et al. | 322—18 |
| 3,012,180 | 12/1961 | Finvold | 318—448 X |
| 3,187,243 | 6/1965 | Long | 318—6 |
| 3,251,563 | 5/1966 | Kleist et al. | |
| 3,293,522 | 12/1966 | Lewis | 318—257 X |

ORIS L. RADER, *Primary Examiner.*

T. E. LYNCH, *Assistant Examiner.*